United States Patent
Klein et al.

(10) Patent No.: US 6,212,243 B1
(45) Date of Patent: Apr. 3, 2001

(54) CHANNEL ESTIMATION PERFORMED AT VARYING TIME INTERVALS

(75) Inventors: Anja Klein, Berlin; Markus Nasshan, Bocholt; Klaus-Dieter Pillekamp, Erkrath, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/455,599

(22) Filed: Dec. 6, 1999

Related U.S. Application Data

(63) Continuation of application No. PCT/DE98/01473, filed on May 28, 1998.

(30) Foreign Application Priority Data

Jun. 6, 1997 (DE) ............................................... 197 24 027

(51) Int. Cl.[7] ............................. H04L 27/01; H04L 27/32
(52) U.S. Cl. ......................... 375/316; 375/229; 375/230; 375/232
(58) Field of Search ............................................... 375/316

(56) References Cited

U.S. PATENT DOCUMENTS

| | | | |
|---|---|---|---|
| 3,764,914 | * 10/1973 | Karnaugh | 375/232 |
| 3,795,865 | * 3/1974 | Armstrong | 375/232 |
| 4,061,978 | * 12/1977 | Motley et al. | 375/232 |
| 5,048,060 | * 9/1991 | Arai et al. | 375/355 |
| 5,103,464 | * 4/1992 | Capkun et al. | 375/355 |
| 5,175,747 | * 12/1992 | Murakami | 375/232 |
| 5,185,764 | * 2/1993 | Baier | 375/231 |
| 5,333,148 | * 7/1994 | Tsubaki et al. | 375/229 |
| 5,619,524 | * 4/1997 | Ling et al. | 375/200 |
| 5,652,772 | * 7/1997 | Isaksson et al. | 375/367 |
| 5,818,876 | * 10/1998 | Love | 375/341 |

FOREIGN PATENT DOCUMENTS

| | | |
|---|---|---|
| 4012850A1 | 10/1991 | (DE) . |
| 4102151A1 | 7/1992 | (DE) . |
| 4329317A1 | 3/1995 | (DE) . |
| 0532485A2 | 3/1993 | (EP) . |
| 2286509 | 8/1995 | (GB) . |
| 11150521 * | 11/1997 | (JP) ............................ H04J/013/00 |
| WO 94/18752 | 8/1994 | (WO) . |

OTHER PUBLICATIONS

Zeng, H.H.; Lang Tong, "Blind Channel Estimation: Comparison Studies and a New Algorithm," Communications, 1995. ICC '95 Seattle, 1995 IEEE Intl Conf on, 1995, vol. 1, pp. 12–16.*

Raleigh, G.G.; Paulraj, A. "Time Varying Vector Channel Estimation for Adaptive Spatial Equalization" Global Telecommunications Conference, 1995. Globecom '95., IEEE, vol. 1, 1995, pp. 218–224.*

* cited by examiner

Primary Examiner—Stephen Chin
Assistant Examiner—Paul N Rupert
(74) Attorney, Agent, or Firm—Herbert L. Lerner; Laurence A. Greenberg; Werner H. Stemer

(57) ABSTRACT

A process for receiving data in which the channel pulse responses are estimated, whereby a time interval between adjustments of a receiver to current channel pulse responses is varied and is adjusted to a change in transmission properties of transmission channels.

17 Claims, 2 Drawing Sheets

CHANNEL ESTIMATION PERFORMED AT VARYING TIME INTERVALS

CROSS-REFERENCE TO RELATED APPLICATION

This is a continuation of copending International Application PCT/DE98/01473, filed May 28, 1998, which designated the United States.

BACKGROUND OF THE INVENTION

Field of the Invention

The invention relates to a process for receiving data and a configuration for conducting the process. The concept "data" also refers to speech data within the scope of this application.

The transmission channels are time-variant and frequency-selective in many information transmission systems, especially mobile radio systems. The procedure is commonly as described below in information transmission systems with time-variant and frequency-selective transmission channels.

Estimation of the transmission properties of the transmission channels is usually done by evaluating and estimating the channel pulse responses (channel evaluation/estimation), which is usually understood to be evaluation/estimation of the amount and phase of the channel pulse responses of the transmission channels. However, detection types are also known which utilize only the amount of the channel pulse responses for determining the transmission properties.

Adaptation of the receiver to the current (estimated) transmission properties or channel pulse responses, whereby it is advantageous to insert knowledge about the transmission properties of the transmission channels in data detection is performed.

Although usually only one current channel pulse response results for a communication connection and the accompanying transmission channel, the discussion in the present specifications is always of an estimation of several channel pulse responses, since new detection processes exist which evaluate the channel pulse responses of several communication connections and the associated transmission channels and utilize them advantageously for data detection. Transmission processes also exist in which a communication connection of several different transmission channels is simultaneously assigned. Other concepts used in connection with the channel pulse response are also introduced in most cases. However, the present application also includes detection techniques in which only one current channel pulse response is evaluated and/or estimated.

In processes known to date, estimations of channel pulse responses are conducted in a certain fixed time frame or even continuously. The receiver is adjusted to the current channel pulse responses after every estimation of the channel pulse responses, i.e., its knowledge about the transmission properties of the transmission channel is updated, so that it can advantageously be inserted in data detection.

The adjustment of the receiver to the current channel pulse responses takes place differently according to the information transmission system. This is presented briefly below by way of several examples.

Channel pulses are used in the GSM for adjustment of multipliers in the criterion formation of the Viterbi detector.

In direct sequence (DS) CDMA mobile radio systems such as, for example, the IS-95, a rake receiver is usually inserted for data detection. Adjustment of the receiver to the current channel pulse responses thereby takes place by setting or adjusting the rake fingers.

In a wideband TDMA system (e.g., a band width of about 2 MHz) with a decision feedback equalizer (DFE), channel pulse responses are used to calculate the filter coefficients of the forward or backward feed filter. An equation system must be solved at great expense to calculate the filter coefficients of the DFE. This is also the case for a wideband TDMA system with a DFSE. The decision feedback sequence equalizer (DFSE) is a combination of MLSE and DFE.

Several different process steps are conducted for data detection in the receiver of a JD-CDMA system. Adjustment of the receiver to the current estimated channel pulse responses essentially takes place, for example with the use of the zero forcing block equalizer (ZF-BLE), essentially in the following 4 steps.

Step 1: For all participants k=1, ... ,K, folding of channel pulse response $h^{(k)}$ of participant k with participant-specific CDMA code $c^{(k)}$, whereby the result is combined pulse response $b^{(k)}$. There can also be several channel pulse responses per participant.

Step 2: Determination of system matrix A based on the combined pulse responses $b^{(k)}$ of all K participants, k=1, ... ,K.

Step 3: Determination of the matrix $A^H A$ (the H set above symbolizes the operation "conjugated complex transposed").

Step 4: Calculation of the Cholesky breakdown of $A^H A$.

Adjustment of the receiver to the current channel pulse response in all cases presented above as examples requires considerable expense, since the performing of many operations such as multiplication, addition, and data transfer to execute the adjustment requires considerable computer work and therefore also high current consumption.

The task presented for the invention is consequently to provide a process and a configuration for conducting the process with which it is possible to achieve reception of data with as low an expense and as high a quality as possible.

As was mentioned above, the estimations of the channel pulse responses are measured in processes known to date in a certain fixed time frame or are even measured continuously. The receiver is adjusted to the current channel pulse responses after every estimation (evaluation). This adjustment accordingly usually also takes place in a fixed time frame. For example, GSM and JD-CDMA use training sequences with which the pulse responses of the mobile radio channels are estimated. These training sequences are measured for each transferred burst, and the receiver is then adjusted to the current channel pulse responses. So-called pilot signals are used in conventional direct sequence (DS)-CDMA mobile radio systems, for example IS-95, to determine the channel properties of the mobile radio channel. These pilot signals are even sent out continuously.

In the case of expensive simulations with simulation instruments expressly manufactured for this purpose, however, it was found that under certain conditions in information transmission systems it could happen that the transmission properties of the transmission channels and accordingly the channel pulse responses altered more slowly than according to the above mentioned fixed time frame. Therefore, the transmission properties of the transmission channels and accordingly the channel pulse responses change so slowly or so insignificantly that it is not necessary to make an adjustment of the receiver to the actual channel pulse values after each evaluation of the channel pulse responses, which indeed take place according to a given fixed time frame. This situation occurs to a greater extent in TDMA systems and accordingly also in JD-CDMA and GSM systems if several consecutively following time slots of the TDMA frame are assigned to one participant. The adjustment of the receiver to the current channel pulse response in a fixed previously determined time frame in this case represents an unnecessary expense that improves data detection only slightly.

SUMMARY OF THE INVENTION

It is accordingly an object of the invention to a process and a configuration for receiving data that overcome the above-mentioned disadvantages of the prior art methods and devices of this general type, in which a time interval between the adjustments of a receiver to current channel pulse responses varies and is adjusted to changes in transmission properties of corresponding transmission channels. The invention is based on the concept of varying the time interval between adjustments of the receiver to the current channel pulse responses according to changes in transmission properties so that reliable data detection takes place with as low an expense as possible, i.e., with as long a time interval as possible between the adjustments of the receiver to the current channel pulse responses.

With the foregoing and other objects in view there is provided, in accordance with the invention, a method for receiving data in which transmission properties of transmission channels are estimated, which includes varying a time interval between adjustments of a receiver in response to current transmission properties of the transmission channels; and adjusting the time interval in response to changes in transmission properties of corresponding transmission channels.

The expense can be reduced by varying the time intervals of the adjustments of the receiver to the current channel pulse responses according to the intensity of changes in transmission properties of the corresponding transmission channels. If a strong change in transmission properties is determined within a certain time intervals, the time interval between the adjustments of the receiver to the current channel pulse responses is reduced. If a small change in transmission properties is detected within certain time intervals, the time interval between adjustments of the receiver to the current channel pulse responses is increased. The weaker the change in the transmission properties, the greater the time interval is between adjustments of the receiver to the current channel pulse responses, and vice versa.

Differing execution variants with which changes in the transmission properties of the corresponding transmission channels can be determined are conceivable.

A preferred execution variant provides for the time interval between adjustments of the receiver to the current channel pulse responses to be adjusted to the change or intensity of the change of the corresponding channel pulse responses.

Another advantageous execution variant provides for the time interval between adjustments of the receiver to the current channel pulse responses to be adjusted to the quality of data received through the corresponding transmission channels. Conclusions are thereby reached from the quality of the data received concerning the strength of the change in transmission properties of the corresponding transmission channels.

Therefore, the interval between the adjustments of the receiver to the current channel pulse responses is then adjusted according to the strength of the change in transmission properties of the corresponding transmission channels. The better the quality of the data received, the greater the time interval between adjustments of the receiver to the current channel pulse responses will be, and vice versa.

In another form of execution of the invention, it is provided that the time interval between estimations of channel pulse responses is possibly additionally adjusted to the quality of the data received. Therefore, the interval between estimations of channel pulse responses can also be varied according to the strength of the change in transmission properties of the corresponding transmission channels if the transmission properties of the corresponding transmission changes are determined on the basis of the quality of the data received.

It is possible in this way to reduce expense and current consumption further in the case of slowly variable transmission channels, since estimation of channel pulse responses is also very expensive.

In another advantageous execution variant, the time interval between adjustments of the receiver to current channel pulse responses is adjusted to measurement values determined in the receiver. The measurement values are characteristic for the transmission properties of the corresponding transmission channels.

Another advantageous execution example provides for the time interval between estimations of channel pulse responses to possibly additionally depend on measurement values determined in the receiver.

Therefore, if the transmission properties or changes in transmission properties of the corresponding transmission channels are determined by estimation of measurement values detected in the receiver, the interval between the estimations of the channel pulse responses can also be varied according to the strength of the change in transmission properties of the corresponding transmission channels.

It is thereby possible to further reduce expense and current consumption in the case of slowly changeable transmission channels.

Other features which are considered as characteristic for the invention are set forth in the appended claims.

Although the invention is illustrated and described herein as embodied in a process and a configuration for receiving data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
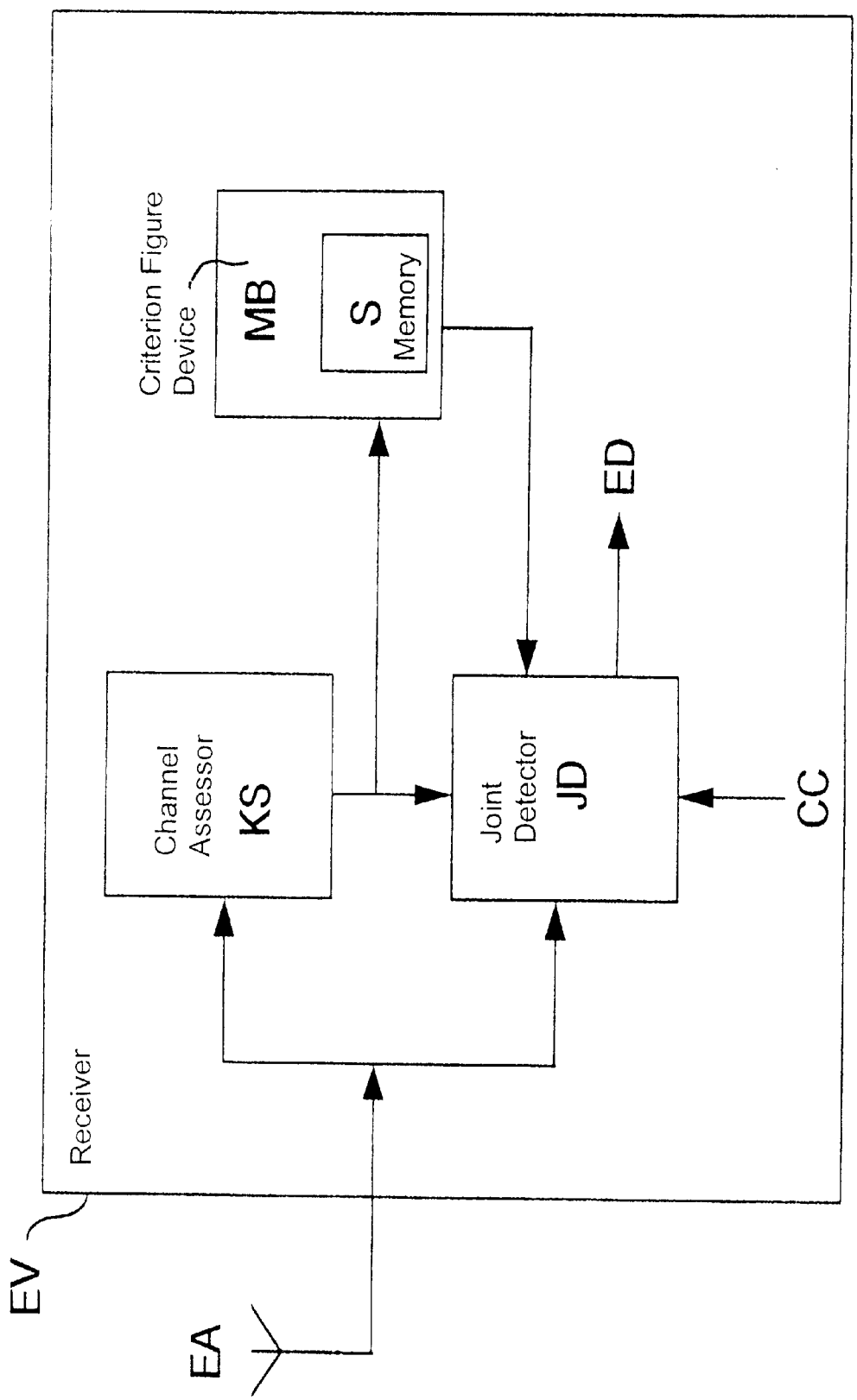
FIG. 1 is a diagrammatic, block circuit diagram of a JD-CDMA receiver in which a time interval between adjustments of the receiver to a current channel pulse responses is adjusted to a change in channel pulse responses according to the invention.

DESCRIPTION OF THE PREFERRED EMBODIMENTS:

In all the figures of the drawing, sub-features and integral parts that correspond to one another bear the same reference symbol in each case. Referring now to the figures of the drawing in detail and first, particularly, to FIG. 1 thereof. In a special form of execution of a process according to the invention, adaptation of a receiver EV to a current channel pulse responses normally takes place in a fixed framework, but whenever transmission properties of a transmission channel do not change or do so only insignificantly, adjustment of the receiver to the current channel pulse responses does not take place. It is thereby possible to considerably reduce computer costs and current consumption in the receiver EV.

The change in transmission properties can advantageously be determined by comparing the newly measured transmission properties with the properties previously measured.

A suitable criterion standard that is a measurement of how greatly the transmission channels have changed can additionally be formed. The criterion value is greater the stronger or greater the change in the transmission properties of the transmission channels is. If the criterion value is greater, adjustment of the receiver EV to the current channel pulse responses takes place. If the criterion value is smaller than a certain threshold, adjustment does not take place.

The block circuit diagram of the JD-CDMA receiver EV is represented in FIG. 1. The receiver EV is provided for uplinking and downlinking information. A single CDMA code (single code option) or several CDMA codes (multi-code option) can be assigned to the participant. A single slot or multi-slots can be assigned to the participant. The receiver EV has a reception antenna EA and a channel assessor KS. The channel assessor KS estimates the channel pulse responses of all active participants in the slot for each burst received. The channel pulse responses of all participants are compared in criterion figures MB with a previously estimated channel pulse responses, which are retained in a memory S. For example, the criterion coming into consideration may be the mean square difference between the new channel pulse responses and those previously estimated. If, for example, a zero forcing block equalizer (ZF-BLE) is considered, adjustment of the time interval between adjustments of the receiver EV to the current channel pulse responses is conducted in the receiver EV of the JD-CDMA system by the criterion figures MB, i.e. in the special form of execution described here, a decision is made as to whether steps 1 to 4 for data detection explained above are carried out in a joint detector JD (transmission properties of the transmission channels have changed), or whether they are not carried out (transmission properties of the transmission channels have changed only insignificantly). The data received ED are then detected in the joint detector JD on the basis of the CDMA codes CC assigned to the different participants. At least substantial parts of the channel assessor KS, the criterion figures MB, and the joint detectors JD can advantageously be developed by software-controlled processors.

Figure 2:
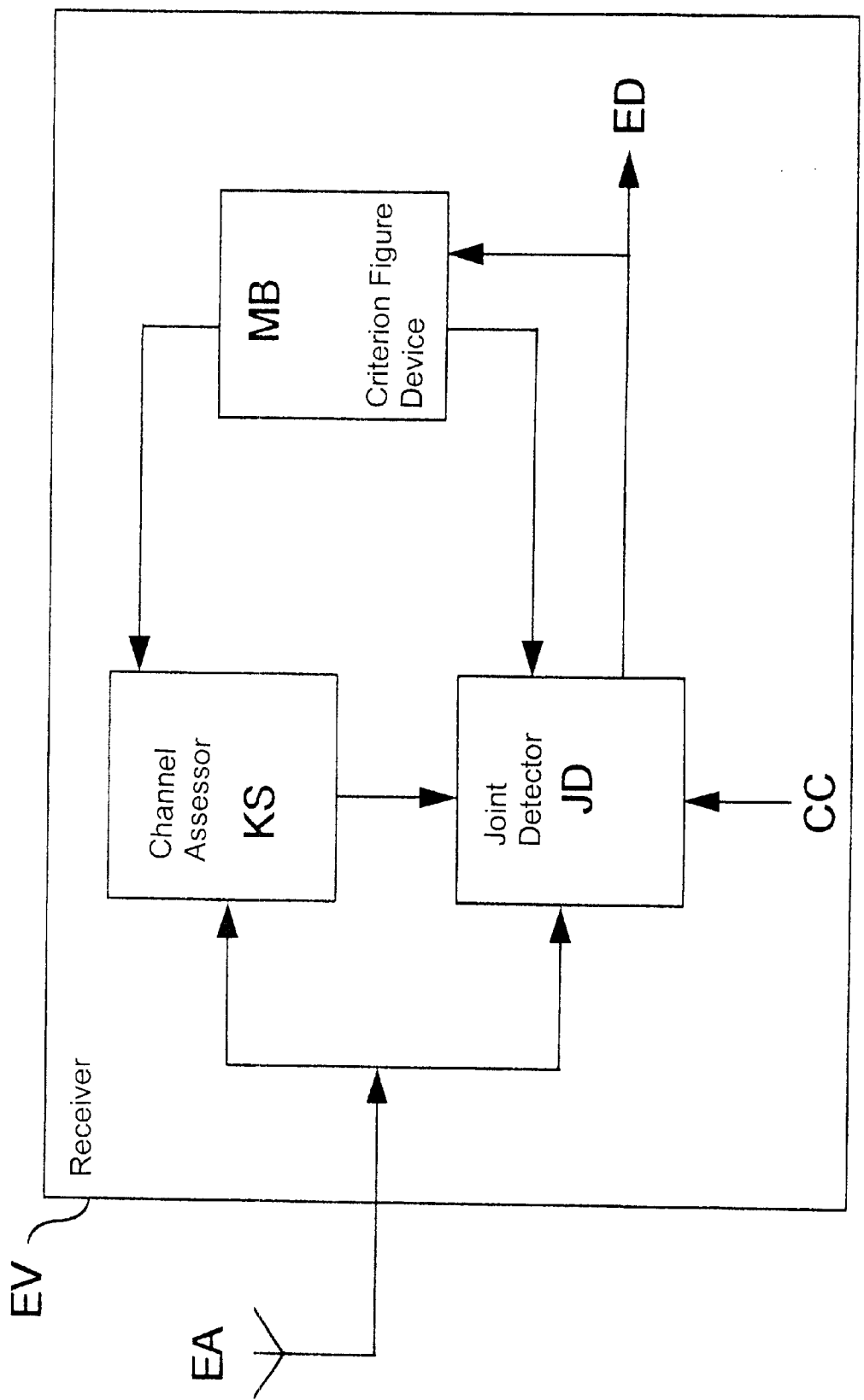
FIG. 2 is a block circuit diagram of the JD-CDMA receiver in which the time interval between adjustments of the receiver to the current channel pulse responses is adjusted to a quality of the data received.

Another advantageous execution variant of the process according to the invention is represented in FIG. 2. The adjustment of the receiver EV to the current channel pulse responses can then only take place if the quality of the transferred data received ED goes below a certain threshold. This execution variant moreover presents the advantage that it is also possible to dispense with estimating the channel pulse response in case of an insignificant change in transmission properties, and accordingly it is possible to additionally reduce the channel estimation cost.

The decision on whether the transmission channels have changed or not, and whether a channel estimate or an adjustment of the receiver EV to the current channel pulse responses must be made can advantageously be based on a criterion depending on the quality of the data received ED. In this case, criterion figures MB provide firstly for deciding whether steps 1 to 4 must be carried out and secondly whether a channel estimate should be made.

The criterion standard can be formed with the continuous value estimated values of the joint detector JD. A possible variant is for the criterion to be greater the greater the variance of the continuous value estimated values of the joint detector JD is. Another variant for forming a criterion standard can be achieved by the use of block codes. If the test sum of known block-coded data has the "correct" value, the transmission channels have changed only insignificantly. If the test sum of known block-coded data does not have the "correct" value, it is necessary to perform a channel estimation and an adjustment of the receiver to the current channel pulse responses.

Other possible detection algorithms for JD-CDMA, in addition to the ZF-BLE mentioned, include:

a) zero-forcing block equalizers with decision feedback (ZF-BDFE);
b) minimum mean square error block equalizer (MMSE-BLE); and
c) minimum mean square error block equalizer with decision feedback.

The process in accordance with the invention can easily be carried out by an expert familiar with these detection techniques.

Instead of criteria which are a measurement for changes in the transmission properties of transmission channels, it is also possible to make use of measurement values which provide information on the transmission properties of the transmission channels or change in transmission properties, such as, for example:

a) speed of the mobilization assigned to the communication connection;
b) Doppler frequency; and
c) change in coordinates, measured with GPS, for example.

Adjustment of the time interval between adjustments of the receiver EV to current channel pulse values as well as adjustment of the time interval between channel estimates to these characteristic measurement values can be done by software-controlled processors.

The process according to the invention can also easily be integrated by an expert into GSM systems, DS-CDMA systems, and wideband TDMA systems with the aid of the present specification and can also be used in so-called multi-user detectors (MUS) and for higher level data services.

The process in accordance with the invention can be a part of transmitter-receiver processes such as are conducted in commercial base stations or communication transmitting units.

The receiver devices in accordance with the invention can be parts of transmitter-receiver devices such as base stations or communication transmitter units.

We claim:

1. A method for receiving data in which transmission properties of transmission channels are estimated, which comprises:

varying a time interval between adjustments of a receiver in response to current transmission properties of the transmission channels; and adjusting the time interval in response to a rate of chance in transmission properties of corresponding transmission channels.

2. The method according to claim 1, which comprises adjusting the time interval between the adjustments of the receiver to current channel pulse responses in response to a change in channel pulse responses.

3. The method according to claim 2, which comprises adjusting the time interval between the adjustments of the receiver to the current channel pulse responses in response to a chance in the quality of the data received through the corresponding transmission channels.

4. The method according to claim 2, which comprises adjusting the time interval between estimations of the channel pulse responses in response to a change in the quality of the data received through the corresponding transmission channels.

5. The method according to claim 2, which comprises adjusting the time interval between the adjustments of the receiver to the current channel pulse responses in response to a change in measured values characteristic of the transmission properties of the corresponding transmission channels.

6. The method according to claim 2, which comprises adjusting the time interval between the estimations of the channel pulse responses in response to a change in measured values characteristic of the transmission properties of the corresponding transmission channels.

7. A method for receiving data in which channel pulse responses are estimated, which comprises:

varying a time interval between adjustments of a receiver to current channel pulse responses; and adjusting the time interval between adjustments of a receiver in response to a rate of change in transmission properties of the corresponding transmission channels.

8. The method according to claim 7, which comprises adjusting the time interval between the adjustments of the receiver to current channel pulse responses in response to a change in the channel pulse responses.

9. The method according to claim 7, which comprises adjusting the time interval between the adjustments of the receiver to current channel pulse responses in response to a chance in the quality of the data received through the corresponding transmission channels.

10. The method according to claim 7, which comprises adjusting the time interval between estimations of the channel pulse responses in response to a change in the quality of the data received through the corresponding transmission channels.

11. The method according to claim 7, which comprises adjusting the time interval between the adjustments of the receiver to current channel pulse responses in response to a chance in measured values characteristic of the transmission properties of the corresponding transmission channels.

12. The method according to claim 7, which comprises adjusting the time interval between estimations of the channel pulse responses in response to a change in measured values characteristic of the transmission properties of the corresponding transmission channels.

13. A receiver, comprising:

means for channel estimation;

means for adjusting the receiver to current channel pulse responses; and means for adjusting a time interval between adjustments of the receiver to current channel pulse responses in response to a rate of change in transmission properties of the corresponding transmission channels.

14. The receiver according to claim 13, including:

means for determining a quality of data received; and means for adjusting the time interval between adjustments of the receiver to current channel pulse responses in response to changes in the quality of the data received.

15. The receiver according to claim 14, including means for adjusting the time interval between estimations of the channel pulse responses in response to changes in the quality of the data received.

16. The receiver according to claim 13, including:

means for determining measurement values characteristic for the transmission properties of a transmission channel; and means for adjusting the time interval between adjustments of the receiver in response to a chance in measured values characteristic of the transmission properties of the transmission channel.

17. The receiver according to claim 16, including means for adjusting the time interval between estimations of the channel pulse responses in response to a change in measured values characteristic of the transmission properties of the transmission channel.

* * * * *

UNITED STATES PATENT AND TRADEMARK OFFICE
CERTIFICATE OF CORRECTION

PATENT NO.   : 6,212,243 B1
DATED        : April 3, 2001
INVENTOR(S)  : Klein et al.

It is certified that error appears in the above-identified patent and that said Letters Patent is hereby corrected as shown below:

Column 7,
Line 1, "chance" should read -- change -- .

Signed and Sealed this

Fourth Day of September, 2001

*Attest:*

*Attesting Officer*

NICHOLAS P. GODICI
*Acting Director of the United States Patent and Trademark Office*